Dec. 15, 1942.　　　P. E. PERMAN　　　2,305,554
VALVE FOR REGULATING THE FLOW OF THE WATER THROUGH HEAT RADIATORS
Filed Feb. 26, 1940　　　2 Sheets-Sheet 1
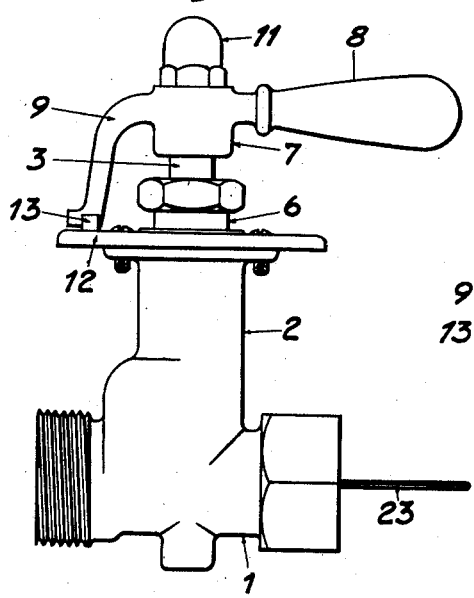
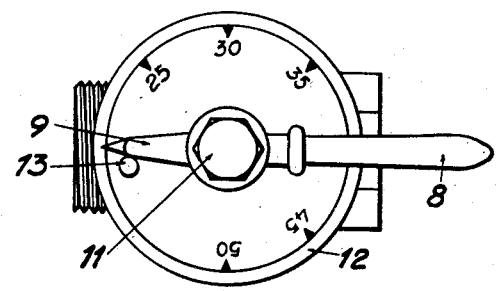
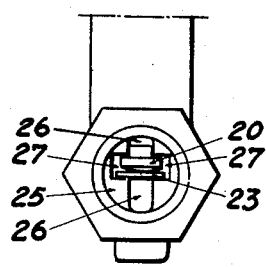
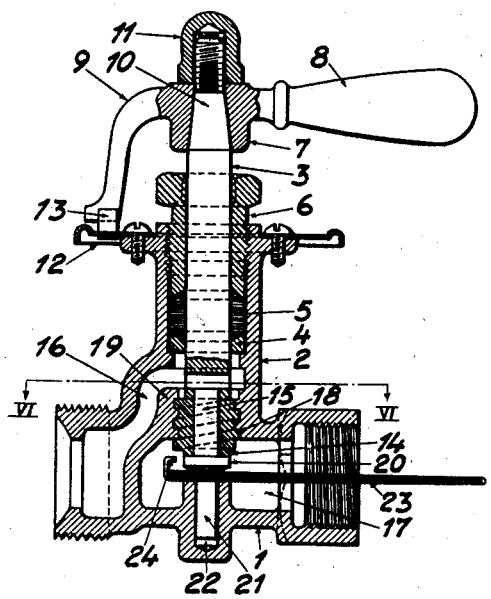
INVENTOR:
Per Emil Perman
BY
his AGENT

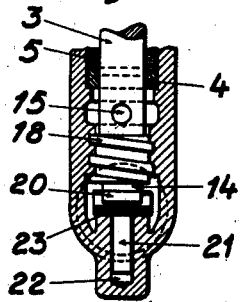
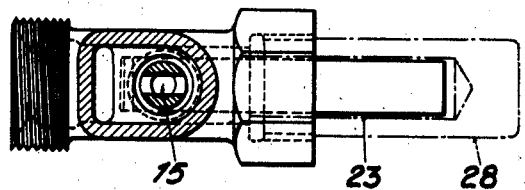
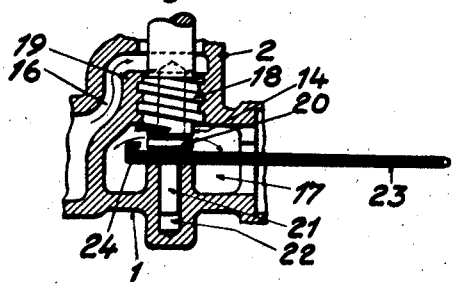
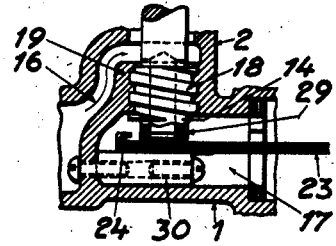

Patented Dec. 15, 1942

2,305,554

UNITED STATES PATENT OFFICE 2,305,554

VALVE FOR REGULATING THE FLOW OF THE WATER THROUGH HEAT RADIATORS

Per Emil Perman, Stockholm, Sweden

Application February 26, 1940, Serial No. 320,776
In Sweden January 18, 1939

2 Claims. (Cl. 236—43)

All available regulating valves for radiators are adapted to be adjusted manually. Consequently, the difference between the various constructions lies only in the greater or smaller possibility of fine adjustment. However, it is clear that if such a radiator valve is adjusted for a certain heat supply this supply remains constant only as long as the other conditions in the plant or system remain constant. But in a central heating plant the conditions are practically never stable. The temperature of the water entering the radiator varies the local pressure in the various parts of the plant varies, thus changing the circulation of the water. The air in the rooms varies. Consequently, it is self-evident that a precision regulation of a central heating plant is impossible by manually adjustable regulating valves.

A real regulation of the heat supply to a room can only be obtained by more or less automatic devices, and the regulation impulses must then be effected by a phenomenon influenced by all the above enumerated variations of the conditions. Such a phenomenon, which moreover is particularly suitable for local regulation by the radiator valves, is the temperature of the water leaving the radiators.

From the viewpoint of comfort a regulation valve should always be located at the top of the radiator. As in this case the valve is to regulate the water outflow the radiator will, consequently, have its outlet at the top and its inlet at the bottom. This involves a heat technical advantage because the hot water entering the radiator mixes with the water already present in the radiator so that practically one and the same temperature is obtained in the various parts of the radiator. This, in its turn, considerably facilitates the practical regulation process, and if, as is usually the case, one touches the top of the radiator one will know that the observed heating is constant all of the surface of the radiator and consequently a true expression for the heat emission. On the contrary, a radiator having its inlet at the top and its outlet at the bottom is always warmer at the top than at the bottom, whereby the temperature difference not only can but, as a matter of fact, also should be very considerable in view of the heat emission of the water, preferably about 20° C., and if in such a case one touches the top of the radiator one will practically only know the temperature of the entering water, but without very troublesome investigations one will not have any real idea of the heat emission conditions, The present invention, which relates to a valve for regulating the flow of the water through heat radiators, is characterized substantially by the fact that a manually operated regulating member in the flow-through channel of the valve and a choking member of bimetal, provided in the same channel and working automatically thermically are combined with one another. This combination by which manual and automatic regulation of the flow through the valve is obtained fills all the demands which have been mentioned in the foregoing and which may be expected from such a regulating valve.

The invention is illustrated in the accompanying drawings, in which

Fig. 1 is a side view and Fig. 2 is a partial end view.

Fig. 3 is a top view and Fig. 4 is a vertical longitudinal section of the invention.

Fig. 5 is a section on line II—II and

Fig. 6 is a section on line III—III of Fig. 1.

Fig. 7 is a partial vertical section showing the valve in a certain opening position, and Fig. 8 is a partial vertical section showing a modified embodiment of the valve also shown in a certain opening position.

The valve consists of a valve box 1 with the usual pipe sockets with outside and inside threads. The valve box 1 is provided with a neck 2 through which extends the valve rod 3 via a stuffing box consisting of a bottom ring 4, a packing 5 and a nut 6. The free end of the rod 3 has a hub 7 provided with a handle 8 and an indicator 9. The hub 7 has a conical bore so that it can be fixed in any position of the indicator on the conical portion of the valve rod 3 and then be locked on the same by the nut 11. A suitably graduated dial 12 having a stopping pin 13 is suitably mounted on the neck-shaped portion 2 of the valve box. The lower end of the valve rod 3 forms a valve seat 14, which is preferably plane in this case and is provided with a channel 15 serving as communication between the inlet side 16 and the outlet side 17 of the valve box. Finally, the lower portion of the valve rod 3 is provided with an adjusting thread 18 which is screwed into the partition wall 19 between the inlet and outlet portions 16 and 17 respectively. In the closed position of the valve a valve body 20 rests against the valve seat 14, said valve body being provided with a guide rod 21 movable in a guide 22 in the valve box 1. In the direction toward the valve seat 14 the valve body 20 is actuated by a bimetal spring 23, and in the direction from the seat 14 it is actuated substantially by the water flow. The guide rod 21 is preferably pushed through holes in the spring 23, and the quantity of the spring motion is limited by a maximum stop 24. Of course, the spring 23 may be adapted to return the valve body 20 itself. Toward the outlet side the valve box 1 is provided with a wall 25 provided with a cross-shaped opening (Fig. 2). The vertical portion 26 of the cross-shaped opening forms a free passage for the water, while the lower edge of the horizontal portion 27 serves as support and guide member for the spring 23. The dot-dashed lines in Fig. 6 indicate the contours of a protecting sleeve 28 of pasteboard or the like. Since the sleeve shall serve as packing for the spring 23 it is located in the inside thread of the valve box 1. Of course, this sleeve 28 is removed when the valve is to be mounted in a pipe. That part of the spring 23 which might extend outside the valve will then project into the pipe which does not involve any drawback. However, the spring may be made so short that no protecting sleeve is required.

The device operates in the following manner:

The closing position of the valve is clear from Fig. 4. In this position the bimetal spring 23 assumes its resting position, which, however, necessarily entails a surrounding temperature of about +20° C. If, however, the water temperature is higher and the rod 3 is being screwed upward, i. e. if the valve seat 14 is being raised, the free end of the spring 23 follows some distance upward together with the valve body 20, but stops when it has reached the position corresponding to the prevailing temperature of the water. If the manual raising of the valve seat continues until a suitable distance from the valve body 20 has been reached, the indicator 9 being moved by the handle 8 to that figure of the dial 12 which is considered to correspond to the actual heat demand, the spring 23 will—in the way already mentioned—maintain the heat supply at the quantity determined by the position of the indicator.

In the device described above the bimetal spring adjusts the position of the valve body 20 in relation to the valve seat 14. However, this is not always necessary. For in most cases the spring 23 itself may constitute the impulse member as well as the regulating member. A device according to this principle is illustrated in Fig. 8 which also shows a device for the electric insulation of the bimetal spring 23, which sometimes might be desirable in view of rust phenomena. However, said latter device is not necessary in common central heating plants in which there is no risk of rust because through the heating the water has been deprived of its air and thus there is no oxygen necessary for the formation of rust.

In the modified embodiment disclosed in Fig. 8 the valve seat 14 is provided with an annular lining 29 of electrically insulating material, fibre or the like. Further, the spring 23 is fixed to a fundament 30 which is also of electrically insulating material, and finally, the wall 25 provided with the cross-shaped opening is made of the same material and fixed in the valve box 1. In this case the free end of the spring 23 can move in the horizontal portion of the cross-shaped opening from and to the mouth of the channel 15 in the valve seat 14 and thus increase (at rise of the temperature) and decrease (at reduction of the temperature) the water quantity flowing out through the mouth of the channel 15.

From the above description it will be seen that the valve operates with manual adjustment as well as automatically. The manual adjustment by the axial displacement of the valve seat relates to adjustment of the valve for a certain heat supply accommodated to the demand. The automatic thermostatic regulation serves to maintain the once adjusted heat supply constant irrespectively of any variations of the outer conditions. In this way one has obtained a real possibility of regulation whereby the regulating valve can fill its proper task of making it possible to the heat consumer to accommodate in a comfortable way the heat supply to the heat demand in different cases, while at the same time the heat supplier, i. e. the property-holder, will automatically have the advantage of the best heat economy. A regulating valve working in this way is, of course, an economical factor of the utmost importance for the entire heat economy. Moreover, no special measures are required for connecting the valve to the plant.

The above description refers to the particular construction shown in the drawings. Naturally, the principle of this invention may be applied in a great many different ways.

Having now described my invention, what I claim as new and desire to secure by Letters Patent is:

1. A valve for regulating the flow of heating water through a radiator comprising a valve casing, inlet and outlet passages in said casing separated by a partition wall having an opening therein, a manually operated spindle extending through said wall opening and arranged movably therein, said spindle provided with a spindle channel ending in an outlet opening in said outlet passage and adapted to connect said inlet and outlet passages, and a bimetallic choking member arranged in said outlet passage and adapted to increase or decrease automatically the quantity of heating water entering said outlet passage through said spindle channel in accordance with changes in the temperature of the heating water by displacement towards or away from said outlet opening, said bimetallic choking member being formed as a hairpin spring, the metal which has the greatest coefficient of expansion being situated inward in the hairpin spring, said hairpin spring being fixed with one leg to the valve box, while the other leg is free and adapted to effect choking of the outlet opening.

2. A valve, as claimed in claim 1, in which the bimetallic hairpin spring is provided with a stop limiting the motion of its free leg.

PER EMIL PERMAN.